Dec. 7, 1926.　　　　　　　　　　　　　　　　　　1,609,865
C. E. DELLENBARGER
SHEET MAKING MACHINE
Filed Dec. 14, 1918　　　7 Sheets-Sheet 7
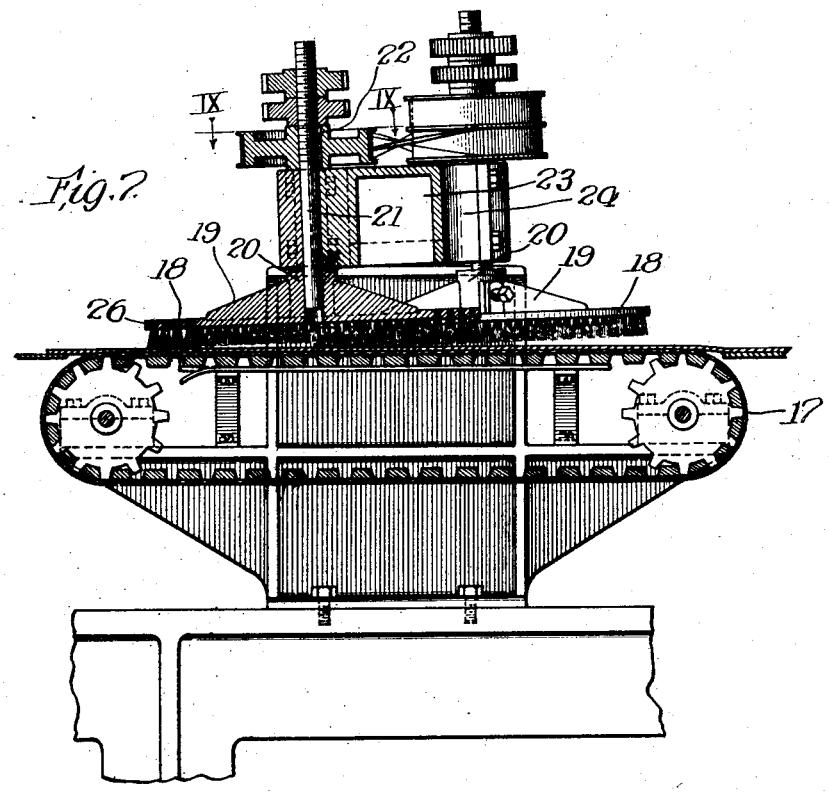
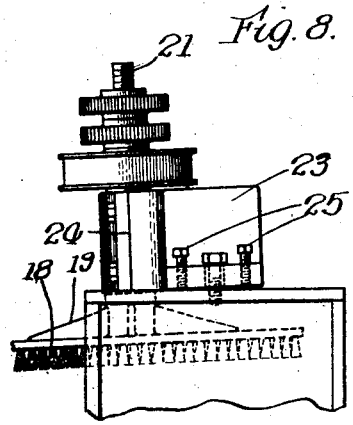
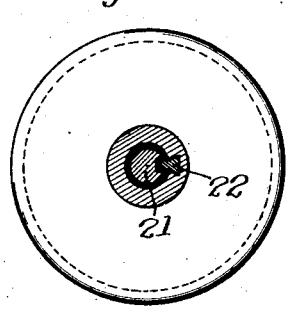
Inventor:
Charles E. Dellenbarger
by attorney
Paul Carpenter Patented Dec. 7, 1926.

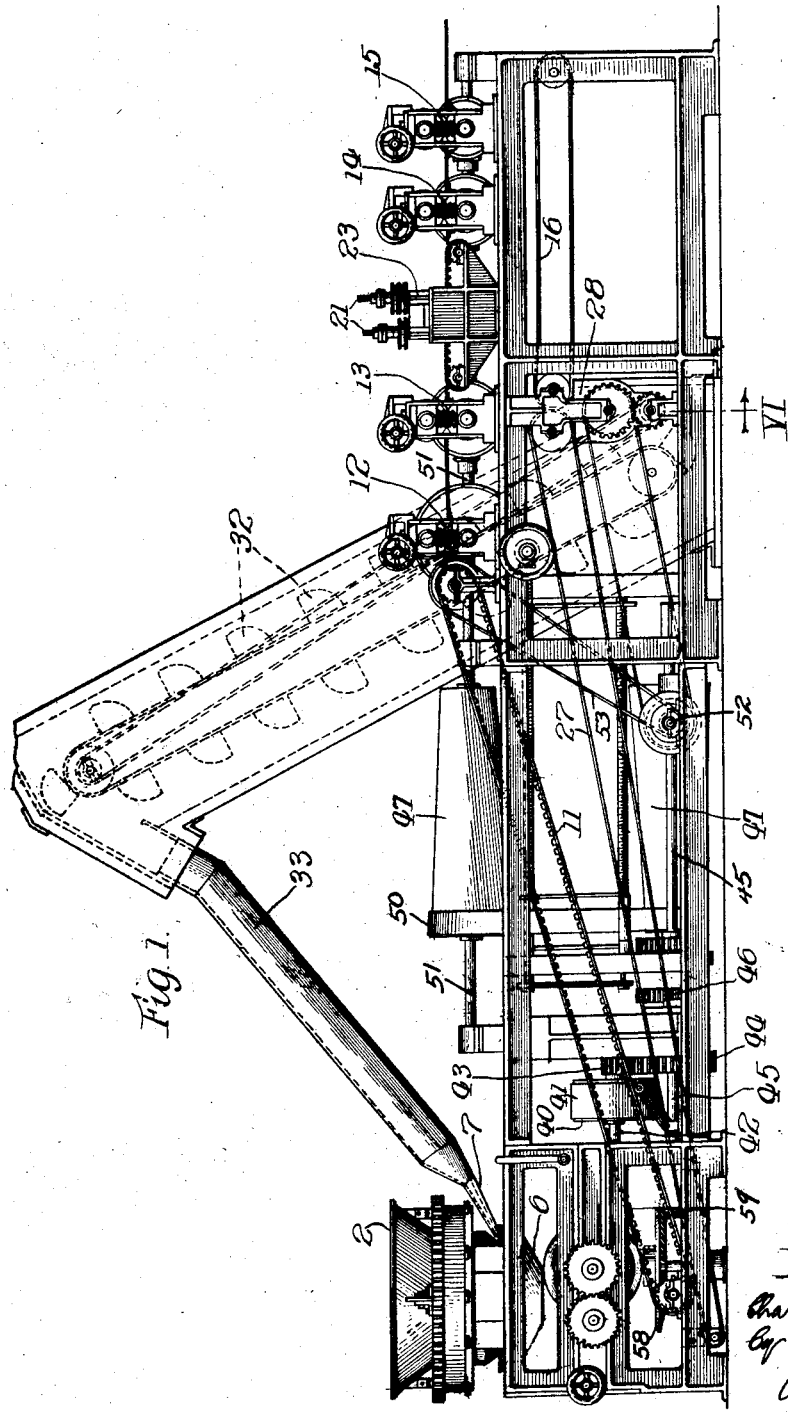

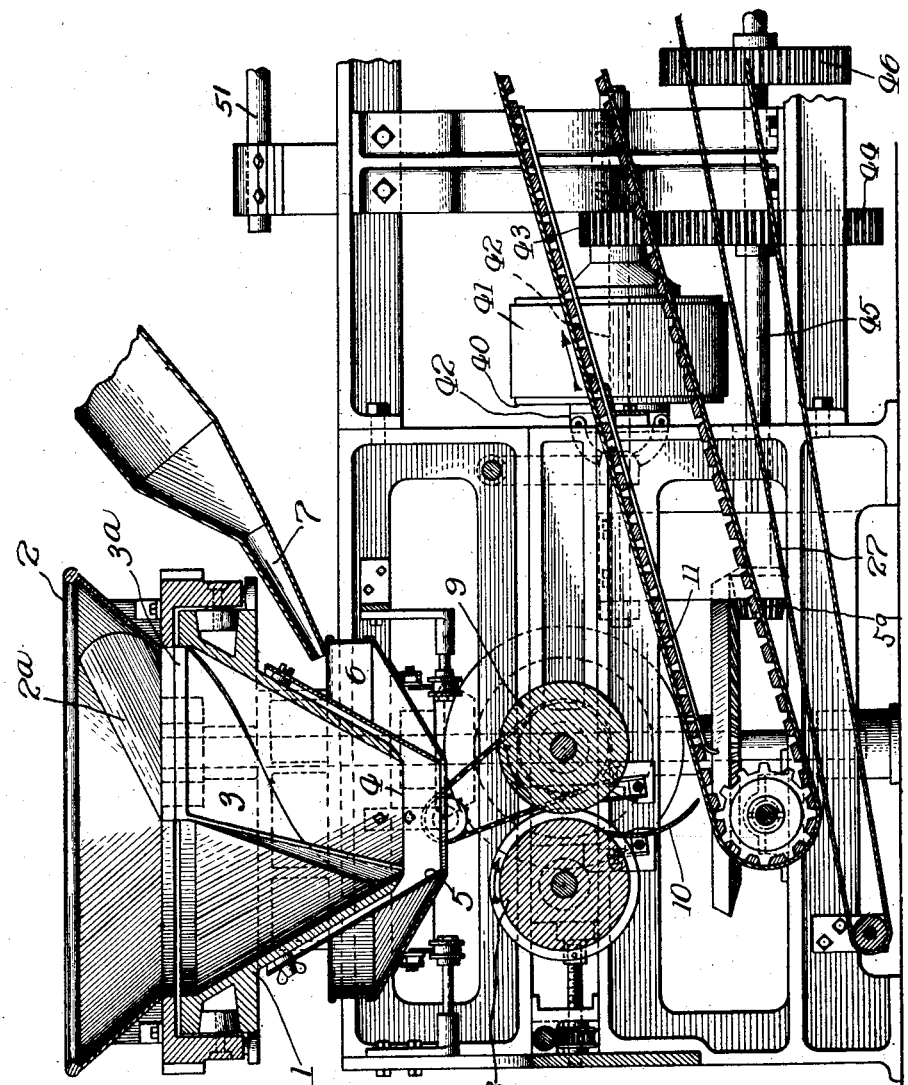

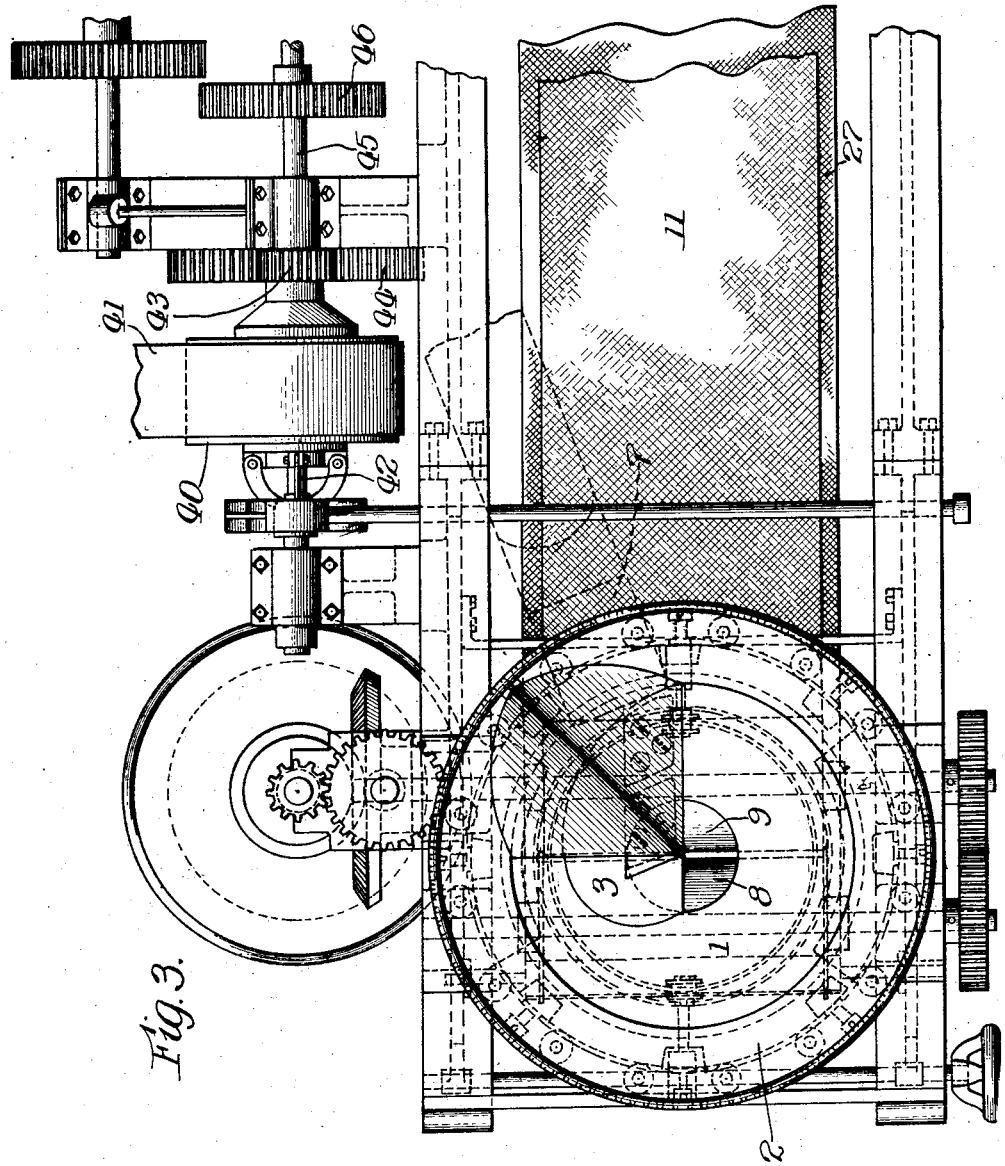

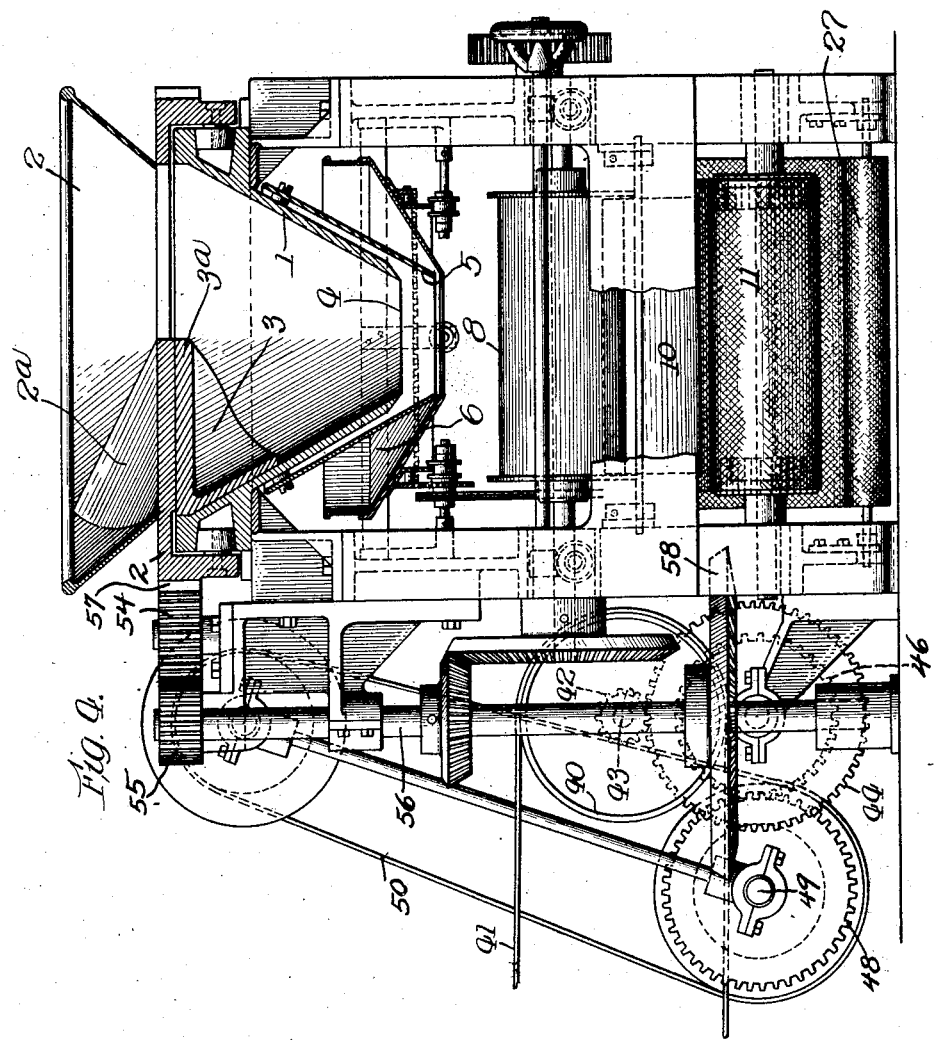

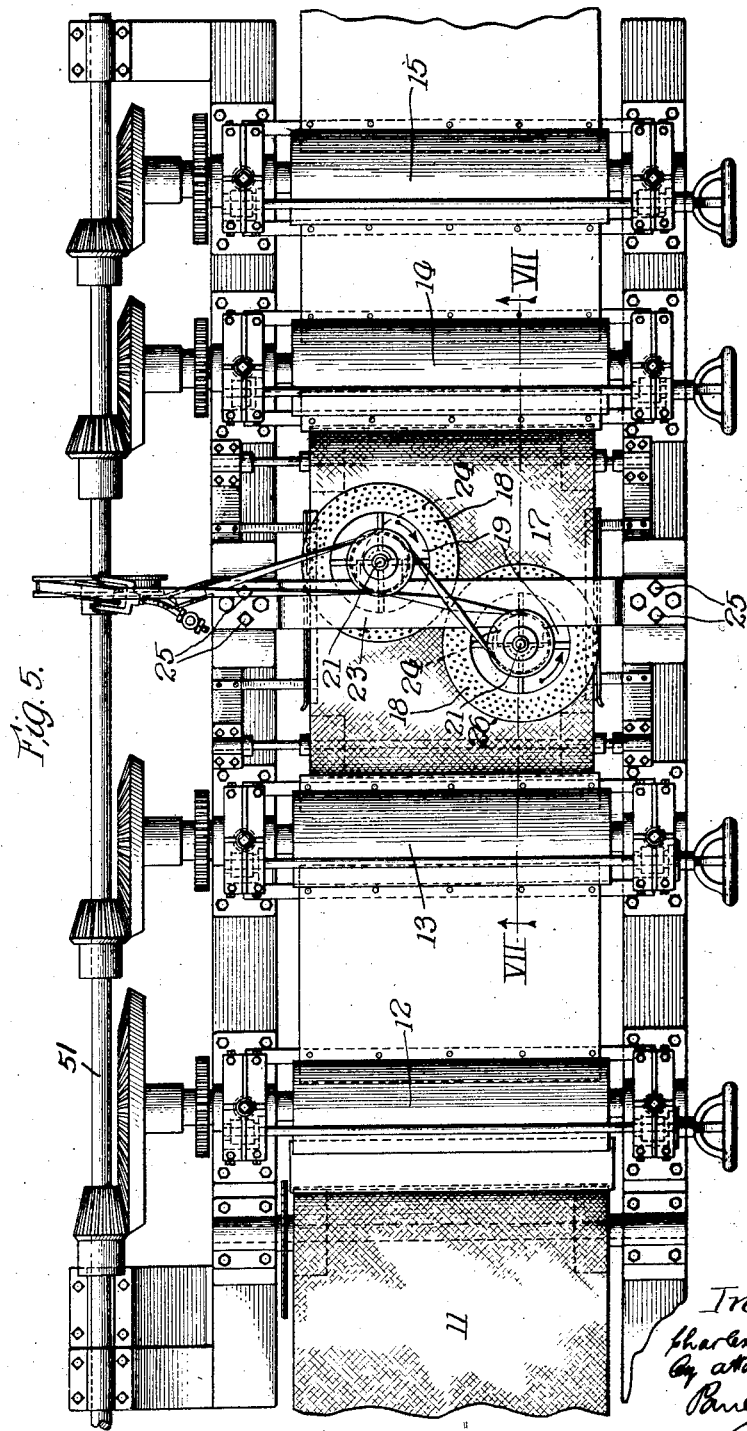

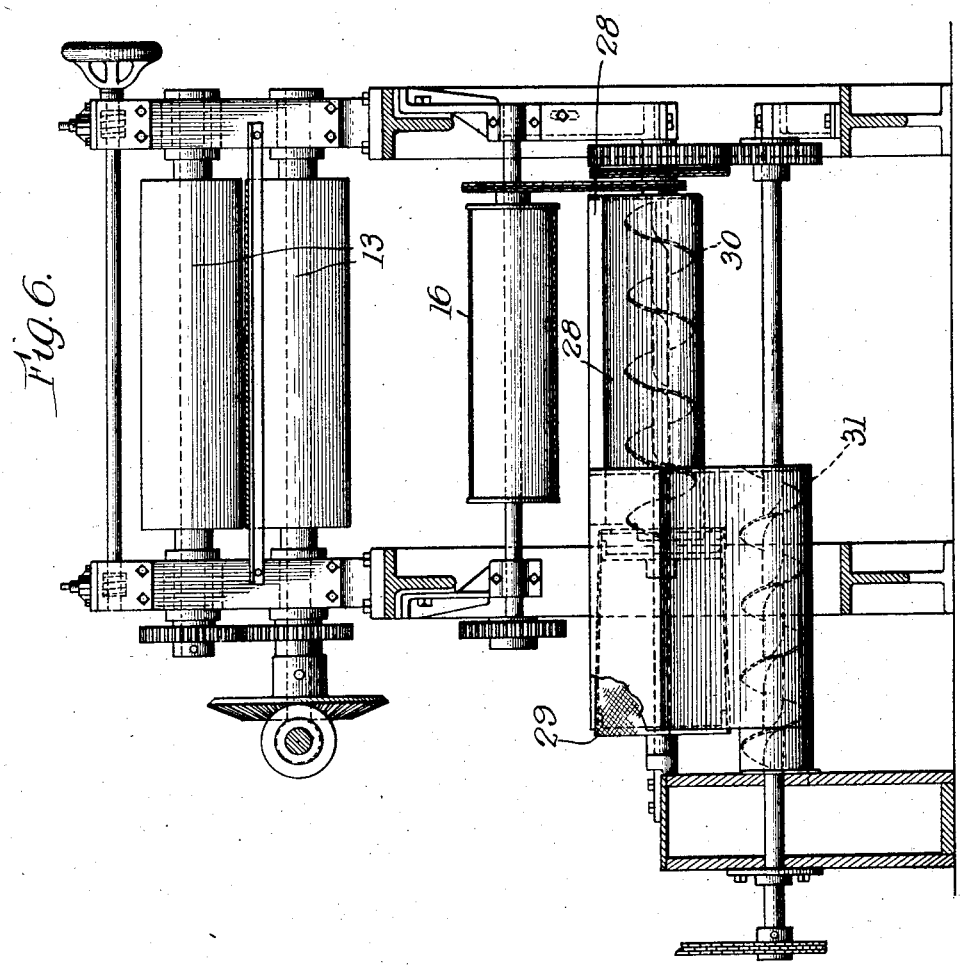

1,609,865

UNITED STATES PATENT OFFICE.

CHARLES E. DELLENBARGER, OF CHICAGO, ILLINOIS, ASSIGNOR TO PAUL CARPENTER, OF CHICAGO, ILLINOIS.

SHEET-MAKING MACHINE.

Application filed December 14, 1918. Serial No. 266,679.

The present invention relates to methods of and machines for forming and handling sheets generally and more particularly for the forming and handling of sheets from resinous, gummy or sticky material and plastic substances such as gum chicle, gum pontianak, gum caoutchouc, chocolate, taffy, cake and biscuit dough and other confectionery and bakery goods, asphaltum, compounds containing tar, pitch, or other bituminous substances, and the like, which under working conditions are sticky, or both sticky and elastic.

While the invention has a wide utility for forming and handling by mechanical means, a large variety of products, for purposes of illustration it is here shown as embodied in a machine for producing mechanically from a mass of softened material, substantially continuous sheets of that form of gum chicle, colloquially known as chewing gum. It will therefore be described in connection with the production of such articles.

The principal objects of my invention are to produce, presently, sheets and eventually sticks, of gum chicle, mechanically, and particularly to produce continuous sheets of substantially uniform width, thickness, consistency and weight without requiring manual or other personal contact with the material by any operative engaged in producing such sheets; to reduce the time required for such production and consequently cheapen the cost of production and enlarge the amount possible for a factory to produce; to produce sheets of a more even and homogeneous texture and more uniform dimensions, density and finish and hence an article more merchantable; to better, by the use of improved machinery, the conditions of hygiene under which such sheets are formed and finished and thereby to preserve, as far as possible, the purity of the material operated upon and prevent the entrance thereinto of any foreign matter and any danger of contamination or infection thereto ensuant from hand manipulation; to provide improved sheet forming mechanism, to provide improved means for preventing the sheet from adhering to the machine elements acting upon it, and to provide improved means for removing and recovering excess materials not consumed in the sheet forming process.

Prior to the machine of the Barbieri Patent No. 968,109, in the manufacture of chewing gum, the plastic material was manipulated largely by hand, and the various processes and steps incident to manufacture necessitated that each relatively short sheet be subjected to the operation of a considerable number of people. In order to maintain the sheets in a sufficiently plastic condition, the manufacture of chewing gum has heretofore necessarily been conducted under conditions of relatively high temperature, rendering it impossible to obtain much that has been desirable in the way of hygienic conditions, owing to the fact that it was not found possible, commercially, to produce and cut continuous sheets of gum by machinery and without manual processing.

The relatively "hot process" practiced by the utilization of the machine of the Barbieri patent involves essentially two main features which it has been found desirable to avoid, the first that the forming rolls had to be heated to keep the gum in plastic condition, thereby not only maintaining a temperature required for working conditions higher than would otherwise be necessary but also rendering the sheet quite plastic and therefore somewhat difficult to handle, since it has been found in practice that the sheet thus produced became easily distorted or torn; and, the second, that the highly plastic and sticky condition of the sheet required the cutting of the sheet from the forming rolls by means of knives which tore or scraped the sheet of gum from the forming rolls, thus producing a relatively rough surface. A further object of my invention has, therefore, been to avoid the expense in, complications of, and other objections to such machines involved in the manufacture, maintenance and operation of the heated forming rolls and scrapers, and to provide a relatively "cold process" and eventually to produce a sheet which has a greater tensile strength and a smoother superficial texture.

In the attainment of the objects above set forth and to overcome the objections stated and also to gain certain other benefits and advantages which will be hereinafter more specifically pointed out, I have provided a machine, a preferred form of which is shown on the accompanying drawings wherein—

Figure 1 is a side elevational view of a machine embodying my present invention;

Figure 2 is an enlarged side elevational view, partly in vertical section, of that part of the machine which is shown at the left end of Figure 1;

Figure 3 is an enlarged plan view of that part of the machine shown at the left hand end of Figure 1;

Figure 4 is an end elevational view, partly in vertical section, viewing the machine from the aspect at the left hand or front end of Figure 1;

Figure 5 is a plan view of that portion of the machine which is shown at the right hand end of Figure 1;

Figure 6 is a transverse elevational view, on an enlarged scale and partly in vertical section, taken on the line VI of Figure 1 and looking toward the right-hand or rear end of the machine;

Figure 7 is an enlarged view, partly in vertical section, taken on the line VII of Figure 5;

Figure 8 is a view of a portion of the device shown in Figure 7 viewed from the aspect of the right-hand end thereof; and Figure 9 is a sectional plan view taken on the line IX of Figure 7.

The machine in its preferred form, as completed for the manufacture of sticks of chewing gum, comprises a series of sets of mechanism through which the material acted upon progresses continuously and is finally formed into small sections suitable for wrapping.

Briefly stated, these sets of mechanisms may be enumerated as follows: (1) the receptacle for receiving and kneading the hot or moist plastic mass to be formed into a sheet, expressing or otherwise delivering it in a continuous stream or bar of somewhat cylindrical form, ready for preliminary forming into a continuous sheet, and, if desired, powdering it and the rolls, as with sugar, preliminarily to the subsequent operations, (2) mechanism for giving such cylindrical length of material its first sheet like form, (3) a conveyor for carrying the sheet a certain distance and delivering it to a set of forming mechanisms, (4) forming mechanisms for reducing the sheet in thickness as it progresses therethrough, (5) means for removing the surplus sugar or other powder, (6) means for collecting the excess powder, (7) means for sifting such collected powder, (8) means including a conveyor system for returning the sifted powder to that end of the machine which is adjacent the first mentioned receptacle, where it is conveniently available for reuse.

Referring first more particularly to figures 2 and 4, which shows the receiving and preliminary forming mechanism most clearly, it will be observed that I have provided a stationary receiver 1, somewhat analogous to a pugging mill, into which the hot, moist or soft plastic material is guided by means of the revolving receiving hopper 2, having an abutment 2ª projecting toward the center of the hopper. Within the mill is arranged a revolving screw 3 having a portion 3ª abutting against the hopper portion 2ª and moving therewith relatively to the stationary receiver 1. The several parts 1, 2, 2ª, 3 and 3ª co-operate in acting as a pugging mill in mixing, tempering, kneading and finally expressing the stream or bar of material. Below the orifice 4 of the mill is placed a guide 5 of general truncated cone form and adjacent the guide 5 is arranged a rotating powder feeding device 6, which may be supplied from any convenient source such as the delivery spout 7 of the powder conveyor, to be below more specifically described. Preliminary forming rolls, rotated in the direction indicated by the arrows, are indicated at 8 and 9 and below them is arranged a guide plate 10 for directing the sheet onto the endless conveyor belt 11 which moves in the direction indicated by the arrow.

Referring now more particularly to Figures 1 and 5, the sheet as it passes from the conveyor belt 11 is directed through oppositely disposed pairs of finishing rolls, 12, 13, 14 and 15 adapted to smooth and compress, and, if desired, to reduce in thickness the sheet as it progresses away from the said rolls 8 and 9.

Referring now more particularly to Figures 5 and 7, it will be noted that at some convenient point toward the right hand or rear end of the machine I have arranged means for removing any excess powder from the sheet and delivering it to an endless belt conveyor 16 and thence to the sifting device presently to be described.

The sheet as it emerges from the pair of rolls indicated at 15 is completed and ready to be cut into suitable lengths for use or for further manipulation.

As will be observed on referring to Figure 7, the mechanism for removing the excess sugar includes a number of brushes 18, driven in the directions indicated by the arrows, (Figure 5), such brushes and their supporting mechanism being in all substantial respects duplicates, and the sheet being sustained in contact therewith by means of an endless conveyor belt 17.

As will be seen on examination of Figures 7, 8, and 9, each of the brush devices 18 forming part of the powder removing mechanism includes a brush body 19 having a central hub 20, within which is mounted a vertical shaft 21, for driving the brush, a feather 22 holding the brush against rotation on the shaft but permitting within limitations free vertical play of the body 19 on the shaft 21.

As is clearly shown in Figure 8, the shaft 21 is supported by a bracket 23, having a journal portion 24, the vertical axis of the shaft being variable by means of set screws 25 whereby that marginal portion 26 of the bristles of the brush, which is toward the left-hand or front end of the machine (Figure 1) bears upon the moving sheet and thereby removes excess powder therefrom laterally and without dragging such powder past such point of contact with the moving sheet.

Referring now more particularly to Figure 6, it will be observed that below the conveyor belt 11 carrying the sheet of gum is arranged a second conveyor belt 27, and that powder falling from the moving sheet, or from the belt 11, or removed from such sheet by the brushes 18 to the belt 16, is discharged into a hopper 28 at one end of the sifter device 29 and propelled through such sifter by a screw conveyor 30; that the powder, as it passes from the sifter device 29 is taken by another screw conveyor 31 and delivered to the bucket conveyor 32 (see Figure 1); and that the powder is finally discharged into a delivery trunk 33 and thence by gravity through the spout 7 into the feed hopper 6. From this it may be seen that so much of the powder as is not incorporated in the sheet is eventually returned again to the hopper 6. It will be further apparent from the foregoing description and inspection of Figure 1 that if at any time it is desired to apply special quantities of powder to any part of the sheet thus far described, or renew supplies in the rotating powder feed device 6, the excess of the powder will eventually be returned to the hopper of such feed device.

While the manner in which the rotating hopper, screw, powder feed device, rolls, and other parts above described, are driven, is unimportant (since they can be driven in any convenient manner so long as they are driven at proper proportional speeds) it will be seen on referring to Figures 1 and 4 that the power is delivered to the machine by means of the pulley 40.

For driving the various parts of the machine described, the driver pulley 40 is driven by a belt 41 from any convenient source of power. This pulley has driving engagement with the shaft 42 by means of a clutch mechanism. On the shaft 42 is arranged a gear 43 driving a gear 44 on the line shaft 45, which carries a gear 46 which meshes with a gear 48 on a shaft 49. The shaft 49 carries the lower one of the two core pulleys 47 which are connected by a belt 50. The upper one of the said pulleys 47 is disposed on the shaft 51, which is the main drive shaft for the rolls 12, 13, 14, 15. The conveyor belt 11 is driven by the shaft 45 through gearing driving the shaft 52 from which is driven a sprocket and chain drive indicated at 53. The hopper 2 is revolved by means of gearing 54, 55, the latter being carried by the vertical shaft 56, and the former engaging the ring gear 57 on the hopper 2. The shaft 56 is rotated by the gear 58 driven by the pinion 59 on the shaft 45.

Briefly stated, the method of operation of the machine is as follows:

The mill 1 is filled with hot, moist or soft plastic material and is gradually fed therefrom in a substantially cylindrical form by means of the feed screw 2. The cylinder thus formed passes between the rolls 8 and 9, being prevented from sticking thereto by means of the application to the cylinder and to the rolls of an ample supply of powdered material fed from the powder feed device 6 which preferably should be rotatably located between the lower end of the mill and said rolls 8 and 9, though auxiliary powder feed devices may be located at any other desired points on the machine. The sheet formed by the rolls 8 and 9 passing on to the belt 11 is thereby transferred upwardly and to the right or rear to the forming or thinning rolls. The material becomes considerably cooled during this transverse of the length of the machine and is therefore of suitable consistency and in the condition requisite for reduction in thickness or other manipulation by the sets of rolls 12, 13, 14 and 15. After it passes the last mentioned rolls, it is ready to be delivered or fed to other mechanism for further action.

Concurrently, the sheet, as it passes from the rolls 13 on to the belt 17, is subjected to the action of the brushes which remove any excess powder from the sheet and such powder, together with any other powder that has fallen on the conveyor belts 16 and 27, is delivered to the sifter device 29, thence to the bucket conveyor 32 and by means of the trunk 33 discharged through the spout 7 into the powder feed device 6, thus completing the cycle of operation.

While I have referred to the bar or stream of material as it issues from the orifice of the mill as a cylinder, it will be appreciated that a circular cross-section is merely a convenience and by no means essential.

Furthermore, while I have referred to a relatively movable hopper and mill, and have disclosed a hopper 2 into which the material to be worked upon is introduced, and have further disclosed as a mill a stationary receiver within which revolves a screw 3 carried by and revolving with said hopper 2, it will be appreciated by those who are skilled in the art to which my invention pertains that other relative arrangements of these three parts may be made in order to insure the production within the receiver 1 and the delivery from the orifice of the said receiver 1, of a bar or stream of material, and may be designed which will afford the relative movement requisite for the production of a flowing mass of material in form suitable to be acted upon by the preliminary forming rolls 8 and 9.

From the foregoing description of my improved sheet making machine and process as arranged for the manufacture of chewing gum, it will be apparent that they are equally applicable for the manufacture of the so-called "prepared roofing" sheets embodying bituminous compounds, wherein a film of fine sand is interposed between the stream of plastic material and the forming mechanism in order to prevent adhesion of the moving bar to the pressure rolls. Similarly that in the manufacture of biscuit, a film of flour may be used to prevent the dough from sticking to the rolls, and that the conveyor 11 may be made of such length as to give the sheet thus formed a sufficient traverse to become dried to such an extent as may be desirable before further operations are carried out. The function of the powdered substance is, generally, to absorb heat or moisture as the case may be and to prevent direct contact of the material of the bar with the forming device, the powder, of course, acting purely superficially with respect to the material of the sheet. It will be equally clear that such time interval as may be required for the cooling or drying of the preliminarily formed sheet may be provided by suitably modifying the length of the conveyor. The sets of rolls 12, 13, 14, 15 may be of such number as is found desirable for the finishing operations, and are preferably vertically adjustable for controlling the thickness of the finshed sheet.

Having thus described my invention and illustrated its use, what I claim as new and desire to secure by Letters Patent is the following:

1. In a machine for forming a sheet from a mass of plastic material, in combination, a relatively movable hopper and mill, said mill being provided with means for expressing material therefrom in a substantially continuous form, and a pair of spaced rolls for receiving the stream of material as it issues from the mill and forming it into a sheet.

2. In a machine for forming a sheet from a mass of plastic material, in combination, a receptacle provided with means for delivering material therefrom in a substantially continuous form, means for receiving the stream of material as it issues from the mill and forming it into a sheet, and a powder feed device for supplying powder whereby the plastic material is prevented from sticking to said forming means, said powder feed device being located between said receptacle and said forming means and adapted to feed the powder directly to said forming means.

3. In a machine for forming a sheet from a mass of plastic material, in combination, a relatively movable hopper and mill, said mill being provided with means for extruding material therefrom in a substantially continuous form, a pair of spaced rolls for receiving the stream of material as it issues from the mill and forming it into a sheet, a second pair of rolls for finishing the sheet formed by said first pair of rolls and a conveyor for conducting the sheet from said first pair of rolls to said second pair of rolls.

4. In a machine for forming a sheet from a mass of plastic material, in combination, a relatively movable hopper and mill, said hopper being provided with an abutment extending toward the center of the hopper and said mill being provided with a screw cooperating with said abutment and adapted for extruding material from the mill in a substantially continuous form, and means for receiving the stream of material as it issues from the mill and forming it into a sheet.

5. In a machine for forming a sheet from a mass of plastic material, in combination, a relatively movable hopper and mill, said hopper being provided with an abutment extending toward the center of the hopper and said mill being provided with a screw cooperating with said abutment, means for rotating said hopper and screw and relatively to said mill, whereby they are adapted for extruding material from the mill in a substantially continuous form, and means for receiving the stream of material as it issues from the mill and forming it into a sheet.

6. In a machine for forming a sheet from a mass of plastic material, in combination, a receptacle for plastic material having a delivery orifice, means for extruding the material therefrom in a substantially continuous form, a pair of spaced rolls for receiving the stream of material as it issues from said receptacle and forming it into a sheet, and a powder feed device for supplying powder to the rolls and the stream of plastic material as it issues from the receptacle whereby it is prevented from sticking to said forming rolls, said powder feed device being located between said receptacle and said rolls.

7. In a machine for forming a sheet from a mass of plastic material, in combination, a receptacle for plastic material, having a delivery orifice, means for extruding the material therefrom in a substantially continuous form, a pair of spaced rolls for receiving the stream of material as it issues from said receptacle and forming it into a sheet, and a powder feed device for supplying powder to the rolls and the stream of plastic material as it issues from the receptacle whereby it is prevented from sticking to said forming rolls, the orifice of the powder feed device being co-axial with the orifice of the receptacle.

8. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, and means for removing the excess powdered material from the sheet after it has passed said forming means.

9. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means and a revolving brush for removing excess powdered material from the sheet after it has passed said forming means.

10. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means and a pair of brushes revolving in opposite directions for removing excess powdered material from the sheet after it has passed said forming means.

11. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means and a revolving brush for removing excess powdered material from the sheet after it has passed said forming means, the face of said brush lying in a plane intersecting that of the moving sheet and being so arranged that a portion only of said brush contacts with said sheet, whereby said brush is prevented from dragging said powder past the point of action of said brush on said sheet.

12. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming rolls, a brush for removing excess powdered material from the sheet after it has passed said forming means, and means disposed below said brush for sustaining the moving sheet in contact with the brush.

13. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, a revolving brush for removing excess powdered material from the sheet after it has passed said forming means, the said brush lying in a plane at an angle to that of the moving sheet whereby the margin only of said brush contacts with said sheet and said brush is thereby prevented from dragging said powder past the point of action of said brush on said sheet, and means for varying the degree of angularity of said brush relative to the path of movement of said sheet.

14. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, means for removing excess powdered material from the sheet after it has passed said forming means, and means for conveying powdered material removed by said removing means to said powder feed device.

15. In a machine for forming a sheet from a mass of plastic material, in combination, a receptacle for plastic material, means for delivering material therefrom in a substantially continuous form, means for receiving the stream of material as it issues from said receptacle and forming it into a sheet, a powder feed device for supplying powder whereby the stream of plastic material is prevented from sticking to said forming means, means for removing excess powdered material from the sheet after it has passed said forming means, and means for sifting the powdered material removed by said removing means and returning the sifted powder to said powder feed device.

16. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, means for removing excess powdered material from the sheet after it has passed said forming means, means, including a sifter, for conveying powdered material removed by said removing means to said powder feed device, and a screw for moving the powder through the sifter.

17. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, means for removing excess powdered material from the sheet after it has passed said forming means, and means, including a sifter, for conveying powdered material removed by said removing means to said powder feed device, and a screw for feeding the powder from the sifter.

18. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, means for removing excess powdered material from the sheet after it has passed said forming means, and means, including a sifter, for conveying powdered material removed by said removing means to said powder feed device, and a plurality of conveyor screws, one for delivering the powder into said sifter and another for moving the powder from the sifter.

19. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of plastic material is prevented from sticking to said forming means, and means for removing excess powdered material from the sheet after it has passed said forming means and means for conveying powdered material removed by said removing means to said powder feed device, the said last mentioned means including a sifter for the powder, and a bucket conveyor for delivering powder from said sifter towards said powder feed device.

20. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of the plastic material is prevented from sticking to said forming device, means for removing excess material from the sheet, and conveyor means for returning such removed material to said powder feed device.

21. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of the plastic material is prevented from sticking to said forming device, means for removing excess material from the sheet, and a conveyor for returning such removed material to said powder feed device, including conveyor mechanism disposed below the sheet during its traverse from said forming means to said removing means.

22. In a machine for forming a sheet from a mass of plastic material, in combination, a receptacle for plastic material, means for delivering the material therefrom in a substantially continuous form, means for receiving the stream of material as it issues from said receptacle and forming it into a sheet, a powder feed device for supplying powder whereby the stream of the plastic material is prevented from sticking to said forming device, means for removing excess material from the sheet, belt conveyors arranged between said forming means and said removing means, and auxiliary means for returning such excess material to said powder feed device.

23. The method of forming a sheet from a plastic mass softened by heat or moisture, which includes the forcing of the material through the orifice of a receptacle in the form of a substantially continuous stream or bar, the preliminary drawing of such material under pressure between a pair of spaced rolls whereby it is flattened, the application of a non-sticky material freely in the path of movement of the length of moving material, whereby such material and the said rolls are subjected to the interposition therebetween of a film of non-sticky material such as powder for cooling or drying the surface of the stream and thereby the material is prevented from sticking to the rolls, the conveying of the flattened sheet to a point away from said receptacle whereby it may become further cooled or dried and thence somewhat hardened, and finally the passing of the sheet under pressure between a pair of spaced finishing rolls whereby it is given a relatively smooth surface, and a substantially uniform texture, density, weight and thickness is imparted to the sheet thus produced.

24. The method of forming a sheet from a plastic mass softened by heat or moisture which includes the forcing of the material through the orifice of a receptacle in the form of a substantially continuous stream or bar, the preliminary drawing of such material under pressure between a pair of spaced rolls whereby it is flattened, the application of a non-sticky material freely in the path of movement of the length of moving material, whereby such material and the said rolls are subjected to the interposition therebetween of a film of non-sticky material such as powder for cooling or drying the surface of the stream and thereby the material is prevented from sticking to the rolls, the conveying of the flattened sheet to a point away from said receptacle whereby it may become further cooled or dried and thence somewhat hardened, the removal of any excess non-sticky material carried by the moving sheet, and finally the passing of the sheet under pressure between a pair of spaced finishing rolls whereby it is given a relatively smooth surface, and a substantially uniform texture, density, weight and thickness is imparted to the sheet thus produced.

In testimony whereof I have hereunder signed my name.

CHARLES E. DELLENBARGER.